Oct. 9, 1951 C. L. KERN 2,570,350
POWER MOVING APPARATUS AND REMOTE CONTROL THEREFOR
Filed Nov. 29, 1948 3 Sheets-Sheet 1
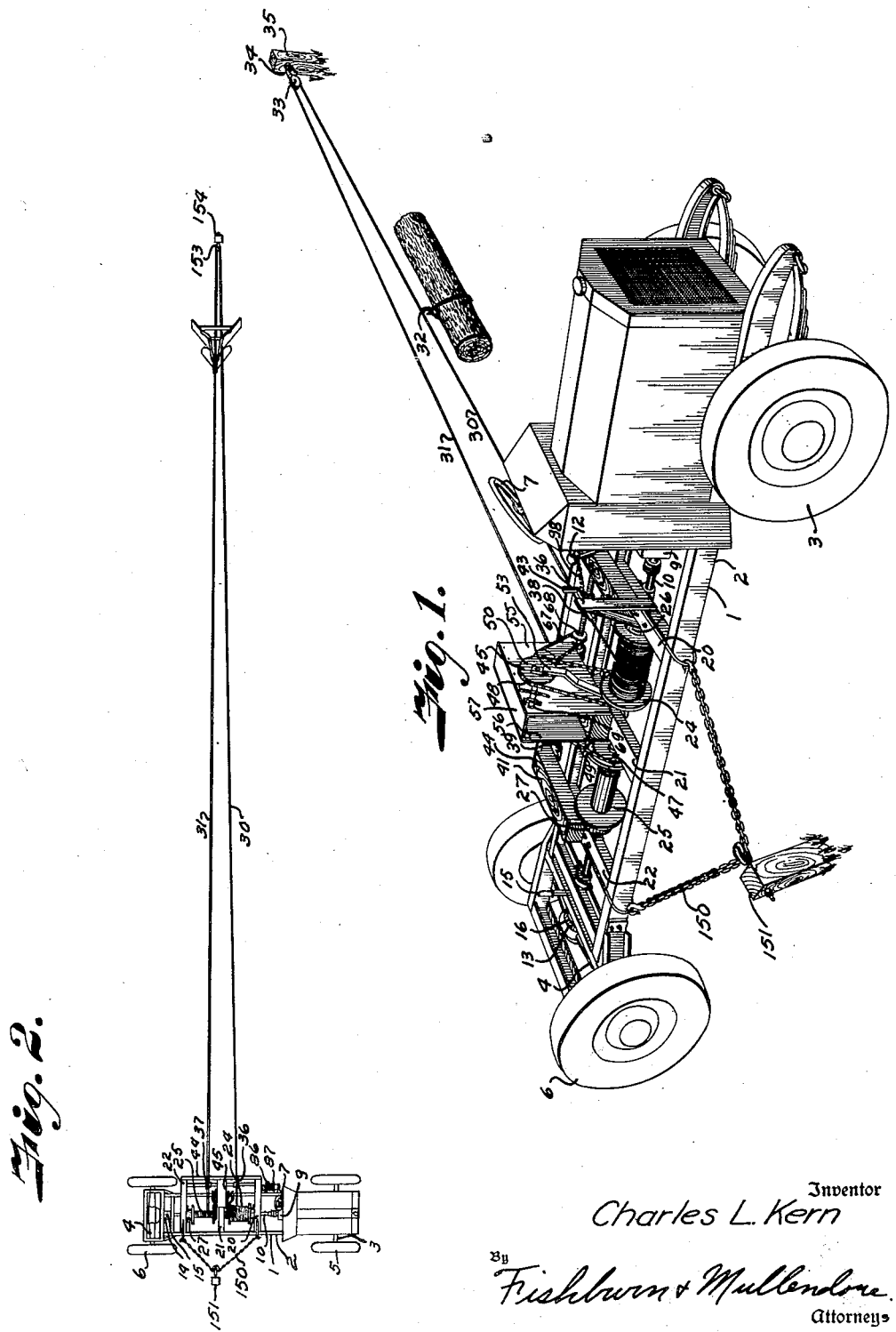
Inventor
Charles L. Kern
By
Fishburn & Mullendore
Attorneys

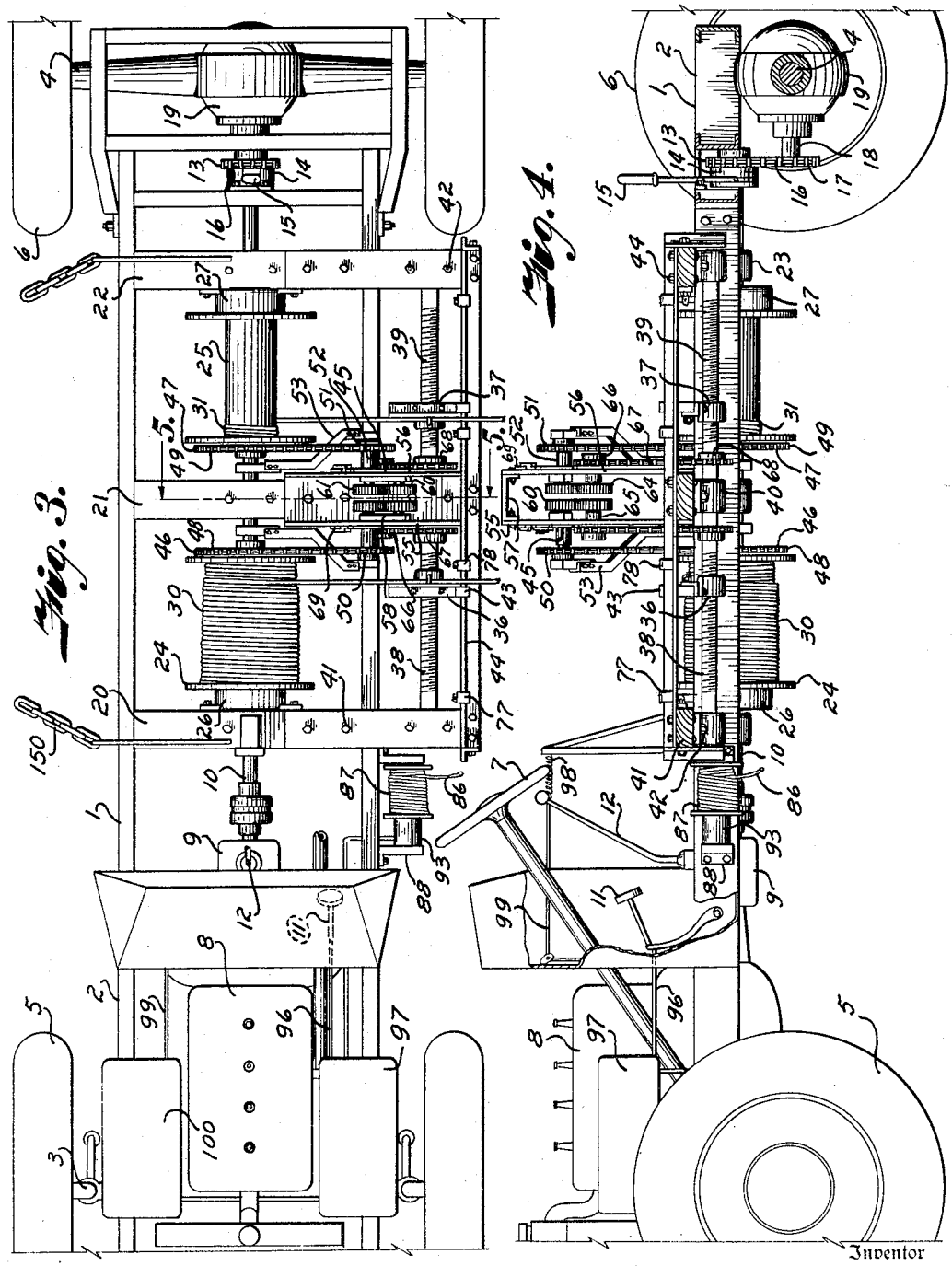

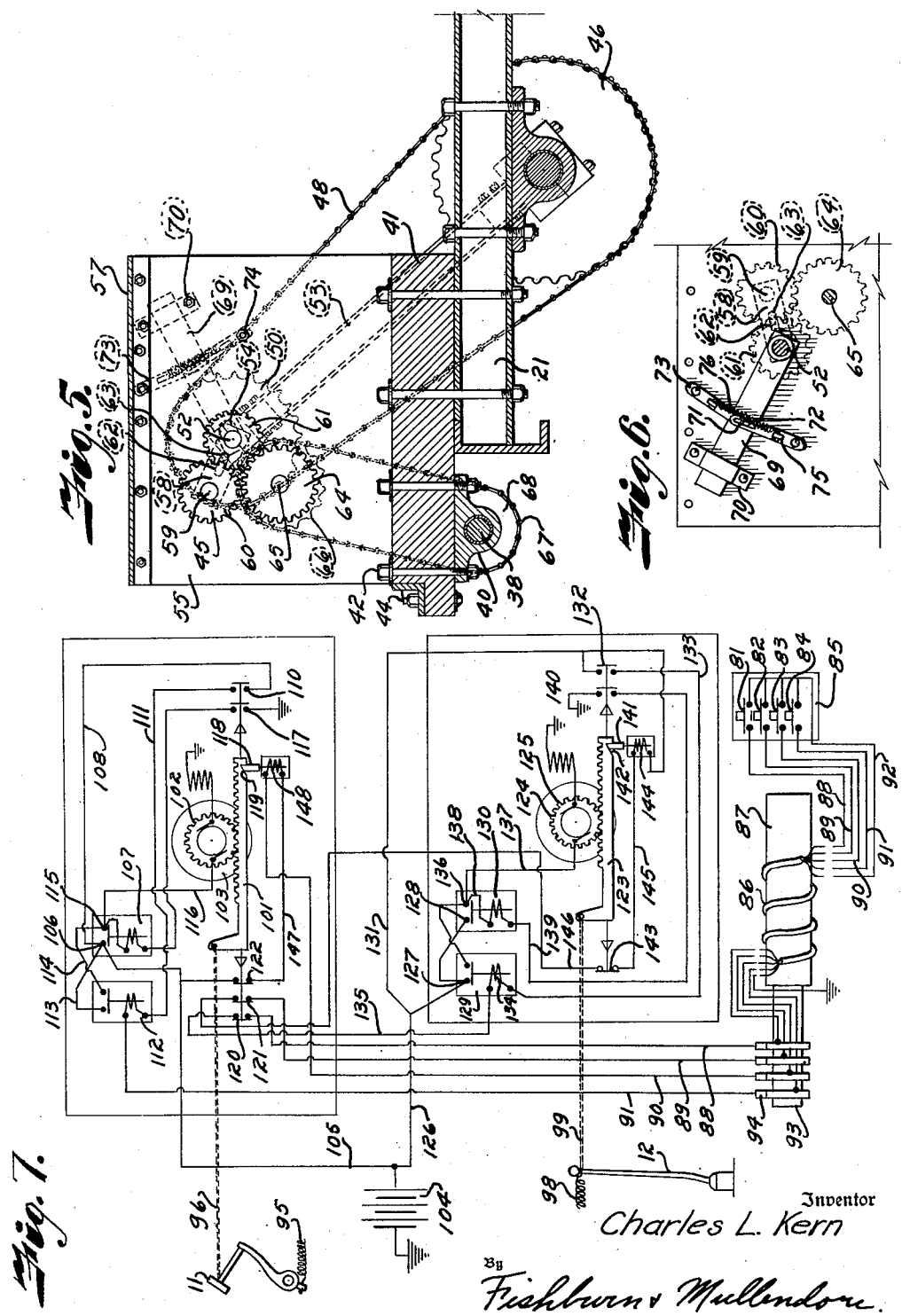

Patented Oct. 9, 1951

2,570,350

UNITED STATES PATENT OFFICE 2,570,350

POWER MOVING APPARATUS AND REMOTE CONTROL THEREFOR

Charles L. Kern, Capps, Ark., assignor of one-half to Alice L. Smith, Kansas City, Mo.

Application November 29, 1948, Serial No. 62,563

3 Claims. (Cl. 254—166)

This invention relates to a power moving apparatus and remote control therefor, and more particularly to a remote controlled power device for moving farm implements, and otherwise performing necessary operations in the clearing, plowing and farming of land.

In some areas, due to hills, stones, trees and other features of the land, it is not practical to till same. A tractor of conventional type is substantially useless as the hills are too steep or other conditions exist whereby a tractor does not have sufficient power to move itself and pull a plow or other equipment over the terrain. It requires from fifty to ninety percent of the power of the tractor to move it alone over some areas, thereby reducing the power applicable for moving farm implements or otherwise performing useful work. Also it is difficult to move cut down shoulders, level gullies and move stones for control of water flow and reduction of soil erosion with conventional equipment.

The objects of the present invention are to provide a power device which may be spotted at a chosen location having power-operated winches connected by lines to the equipment to be moved over the terrain whereby the full power of the power unit on the device is available for moving said equipment; to provide a power device for moving implements over an area for working the soil without leaving tire marks or tracks therein; to provide a remote control for the power device for effecting operation thereof from the position of the implement or other device being moved; to provide a power device embodying in connection with the gearing and power unit for propelling the vehicle a plurality of selectively operable power-driven means for moving or raising implements or other material constituting the load toward or away from the vehicle; to provide electric operating devices controlled from a position remote from the power device for selectively effecting forward and reverse drive of the implement moving apparatus; to provide novel mechanism for guiding and supporting the load moving cables; and to provide a remote control, power moving mechanism of simple, economical construction, that can be driven from the engine of the vehicle in such a manner as to apply the full power thereof for the moving of implements and be controlled in a simple and convenient manner.

In accomplishing these and other objects of the present invention, I have provided improved details of structure, the preferred forms of which are illustrated in the accompanying drawings, wherein:

Fig. 1 is a perspective view of the power moving apparatus and control therefor in position for moving implements or the like as in the working of land.

Fig. 2 is a plan view of the power moving apparatus illustrated as being connected to a plow for the farming of land.

Fig. 3 is a detail plan view of the motor vehicle illustrating the position of the cable operating devices thereon.

Fig. 4 is a side elevation of the power moving apparatus, portions being broken away to better illustrate the drive for the vehicle.

Fig. 5 is a transverse sectional view on the line 5—5, Fig. 3, showing the drive for the cable guiding mechanism.

Fig. 6 is an elevation of the gear shifting lever for reversing the direction of movement of the cable guiding mechanism.

Fig. 7 is a wiring diagram of the electrical control for the apparatus.

Referring more in detail to the drawings:

1 designates a vehicle having a frame 2 provided with front and rear axles 3 and 4 carrying wheels 5 and 6 respectively in a similar manner to a conventional motor truck. The front wheels are suitably mounted for steering by means of a steering wheel 7. 8 designates the engine installed at the front of the frame and communicating power in the usual manner through the transmission 9 to a drive shaft 10 under control of a clutch operating pedal 11. The transmission 9 contains suitable gears (not shown) operated by a gear shift lever 12 for effecting various forward and reverse speeds of the drive shaft 10. The drive shaft 10 extends toward the rear of the frame 2 and has suitable driving connection with the rear axle. For example a sprocket 13 is rotatably mounted on the end of the drive shaft and is engageable by a clutch collar 14 keyed to the shaft and slidable thereon by a lever 15 to effect driving of the sprocket 13. The sprocket 13 is operably connected by a chain 16 with a sprocket 17 mounted on a shaft 18 having suitable driving connection with a differential gearing inside of the housing 19 of the rear axle 4.

The frame 2 is preferably provided with a plurality of transverse longitudinally spaced members 20, 21 and 22, having depending bearing members 23 for supporting the drive shaft 10. Freely rotatable on the drive shaft between the transverse members 20 and 21 is a flanged drum 24 and rotatably mounted on the drive shaft between the transverse members 21 and 22 is a flanged drum 25. Mounted on the drive shaft 10 are automatic mechanical clutches 26 and 27 adapted to effect driving connection between the shaft 10 and the drums 24 and 25 respectively. The clutches are such that rotation of the shaft 10 in clockwise direction will cause the clutch 26 to effect driving of the drum 24 and the clutch 27 will allow free turning of the drum 25 at any speed. Rotation of the shaft 10 in a counter clockwise direction will cause the clutch 27 to effect driving of the drum 25 and will allow free turning of the drum 24 at any speed. A cable 30 is wound upon the drum 24 in such direction that rotation of the drum from the shaft 10 will result in further winding of the cable on the drum. A cable 31 is wound upon the drum 25 in such direction that the rotation of the drum from the drive shaft 10 when cable is being wound on the drum 24 will result in unwinding of the cable from the drum 25. In other words, the cables 30 and 31 are wound on the respective drums in opposite directions. The end 32 of the cable 30 is adapted to be attached to a plow or other device to be moved whereby operation of the motor 8 to turn the drive shaft 10 in a normal forward direction with the clutch 26 engaged with the drum 24, will draw the plow or other implement toward the vehicle.

The cable 31 extends over a pulley 33 of the pulley block 34 adapted to be secured to a stake 35 driven or otherwise applied in the ground on the opposite side of the field over which the plow is to be operated, the end of said cable 31 being attached to the end of the plow opposite the attachment of the cable 30. With this arrangement, disengagement of the drive connection with the drum 24 and engagement of the drive connection with the drum 25 will cause the cable 31 to be wound on the drum 25 to draw the plow toward the stake 35.

In order to guide the cables 30 and 31 for proper spooling on the respective drums, cable guides 36 and 37 are threadably mounted on screws 38 and 39 respectively rotatably carried in bearings 40 depending from extensions 41 secured to the transverse members 20, 21 and 22 by suitable fastening devices 42, such as bolts or the like. The guide members 36 and 37 have arms 43 adapted to engage and ride on a rail 44 suitably secured to the end of the extensions 41, whereby the arms 43 prevent the guides 36 and 37 from rotating with the screws 38 and 39. The screws are suitably driven through the reversing mechanism 45 from sprockets 46 and 47 secured to the drums 24 and 25. Chains 48 and 49 drivingly connect the sprockets 46 and 47 with sprockets 50 and 51 respectively carried on shafts 52 rotatably mounted in arms 53 in spaced relation to the shaft 10. The opposite ends of the arms 53 are rotatably mounted on the drive shaft 10 adjacent the drums 24 and 25. With this arrangement, the arms 53 may rotate about the drive shaft 10 to change the position of the shaft 52 without altering the length of the chains 48 and 49.

The shafts 52 extend through slots 54 of plates 55 and 56 carried on opposite sides of the extension 41 mounted on the transverse member 21, the upper ends of said plates being held in spaced relation by a channel member 57 secured thereto. Rotatably mounted on the adjacent ends of the shafts 52 are arms 58, the outer ends of which carry shafts 59 rotatably mounting gears 60 meshing with gears 61 on the shafts 52. Each of said arms is provided with slots 62 engaging pins 63 carried in the plates 55 and 56 whereby swinging of the arm 53 effects a swinging movement of the arm 58 and controls engagement of the gears 60 and 61 with gears 64 carried on shafts 65 rotatably mounted in the plates 55 and 56, the outer ends of the shafts 65 having sprockets 66 fixed thereon for driving chains 67 operatively connecting the sprocket 66 with sprockets 68 on the screws 38 and 39 respectively.

Swinging movement of the arms 53 is controlled by bars 69 having one end rotatably mounted on the shafts 52 and the opposite end slidably mounted in brackets 70 fixed to the outer faces of the plates 55 and 56, said bars having pins 71 engaging in slots 72 of toggle links 73 extending on opposite sides of the bars 69, the outer ends of the links being pivotally mounted as at 74 to the plates 55 and 56. The links are provided with lugs 75 arranged between the slots and the pivotal connections, said lugs being connected by a spring 76 tending to hold the links on one side or the other of dead center position of said links.

The rail 44 is provided with stops 77 and 78 adapted to be engaged by the arms 43 when the guides 36 and 37 reach the end of the movement toward the ends of the drums and the spooling of the cable thereon. When the arms 43 engage the lugs 77 or 78, the resistance to movement causes the gears 60 or 61 engaging the gear 64 to tend to slip from said engaging relation to rock the arms 58 on the pins 62, moving the bar 69 past the dead center position of the links 73. This movement and the rocking movement of the arm 58 effect engagement of the other gear with the gear 64 to reverse the direction of rotation of the screws 38 and 39.

Operation of the drums 24 and 25 is controlled remote from the vehicle 1 by means of a plurality of switches 81, 82, 83 and 84 in a control box 85, wires leading to the switches in the terminal being enclosed in a conduit 86 which is wound on a reel 87 rotatably mounted in supports 88 on the side of the frame 2. Any suitable means for rotating the reel for winding the conduit thereon may be used. Located in the conduit are wires 88, 89, 90 and 91 leading to terminals of the push-button switches 81, 82, 83, and 84 respectively, the other terminals of the switches being connected to a ground wire 92 also located in the conduit. The respective wires are connected to conductor rings 93 on the shaft of the reel 87, said rings being contacted by brushes 94 to form a continuation of the wires to the electrical apparatus for controlling the clutch and gear shift mechanism.

The clutch pedal is provided with a spring 95 tending to hold same in a clutch-engaging position. In order to throw the clutch out or in disengaged position, the clutch pedal is connected by a link 96 with the electrical mechanism in a housing 97 carried under the hood of the vehicle. The gear shift lever is provided with a spring 98 tending to hold same in position for engaging gears in the transmission to operate the drive shaft 10 in a forward direction, the gear shift lever being moved to effect engagement of the reverse gears by means of a link 99 connected with electrically operated mechanism in the housing 100 located under the hood of the vehicle. The link 96 connected with the clutch pedal has its opposite end connected to a rack 101 meshing with a pinion 102 adapted to be driven by a motor 103. When the clutch is in engaged position and it is desired to disengage same, the switch 84 is pressed to complete the circuit from a battery 104 through conductor 105 to a contact 106 of a relay 107, said contact also being connected by a conductor 108 leading to a limit switch, the other terminal of the switch 110 being connected by a conductor 111 to a coil of a relay 112, the other terminal of the coil being connected to the conductor 91 to complete the circuit through the switch 84 and ground conductor 92 which is connected to the frame of the vehicle. The flow of current through said circuit closes the contacts of the relay 112, which are connected by a conductor 113 with the contact 106, the other contact of said relay being connected by a conductor 114 with the contact 115 of the relay 107, the contact 115 being connected by a conductor 116 with the terminal of the motor 103, the other terminal of which is connected to the ground.

The contact 115 is also connected to the coil of the relay 107, said coil being connected through the limit switch 117 to a ground connection whereby the relay 107 forms a holding circuit for continuous energization of the motor 103 to move the rack 101 sufficiently to disengage the clutch, at which time the limit switches 110 and 117 will be disengaged. Simultaneously with disengagement of the limit switches a spring-pressed latch 118 will engage in a recess 119 in the rack 101 to hold the clutch in disengaged position. Also limit switches 120, 121 and 122 will be engaged for use as later described.

While the clutch is disengaged the gear shift lever may be operated to change the direction of operation of the drive shaft 10. The link 99 connected to the gear shift lever is suitably connected to a rack 123 having meshing engagement with a pinion 124 driven by a motor 125. In order to shift the gears to the reverse, the push-button 81 is operated to close the switch whereby current will flow from the battery 104 through a conductor 126 to contacts 127 and 128 of relays 129 and 130 respectively. A branch conductor 131 causes current to flow to a limit switch 132 connected by a conductor 133 to the coil 134 of the relay 129, the terminal of the coil 134 being connected by a conductor 135 to the limit switch 120, the other terminal of which is connected by the conductor 88 to the switch 81 for flow of current therethrough and through the ground connection 86. Completion of said circuit energizes the relay 129 to operate same to complete a circuit from the battery through the conductor 126, relay 129, conductor 135, and the terminal 136 of the relay 130, said terminal being connected by a conductor 137 with the motor 125, the other terminal of which is connected to the ground, energizing the motor to move the rack and draw the gear shift lever toward reverse position.

Flow of current to the motor also effects flow of current from the contact 136 through a conductor 138, to the coils of the relay 130, the other terminal of the coil being connected by a conductor 139 with the limit switch 140 the other terminal of which is connected to the ground to complete the circuit and hold the circuit to the motor for continuously energizing same to complete the movement of the gear shift lever until the reverse gear is engaged at which time the limit switches 132 and 140 are disengaged. Simultaneously with disengagement of the limit switches a latch 141 engages in a recess 142 in the rack 123 to hold same in the reverse position. Also a limit switch 143 is engaged.

If it is desired to move the gear shift lever to forward gear position, the push-button switch 82 is operated to complete a circuit from the battery 104 through the conductor 126, branch 131 and a solenoid coil 144 adapted to disengage the latch 141 from the rack 123. The other terminal of the coil 144 is connected by a conductor 145 with the limit switch 143, the other terminal of which is connected by a conductor 146 through the limit switch 121 to conductor 89 to complete a circuit therethrough and through the push-button 82 and ground conductor 86. The release of the latch 141 permits the springs 98 to draw the gear shift lever to the forward position, disengaging the limit switch 143 and engaging limit switches 132 and 140.

In order to engage the clutch, the push-button switch 83 is closed to complete a circuit from the battery 104 through the conductor 105, limit switch 122, conductor 147 to a solenoid coil 148, adapted to withdraw the latch 118 from the recess 119 in the rack 101. The other terminal of the coil 148 is connected by the conductor 90 to the push-button switch 83 to complete the circuit through the ground connection 86. Releasing the latch 118 permits the springs 95 to move the clutch operating pedal to engaged position.

In operating a device constructed as described the vehicle is driven to one side of a field to be cultivated in a suitable position for operating the farm implement, such as a plow. A chain 150 is then connected at spaced points on the vehicle and an intermediate point to a stake 151. The chain may be applied to a pulley on the stake to permit some freedom of movement or positioning of the vehicle relative to the stake. A cable 31 is then drawn from the drum 25, threaded through a pulley 153 and a stake 154 driven into the ground on the opposite side of the field, the end of the cable 31 being drawn back through the vehicle and secured to the end of the cable 30. The push-button 84 is then operated to energize the motor 103 to move the clutch lever to disengaged position. The engine 8 is then started and the push-button 81 depressed to energize the motor 125 as described to move the gear shift lever to reverse position. The push-button 83 is depressed to release the latch 118 permitting the spring 95 to re-engage the clutch effecting reverse operation of the drive shaft 10 and operation of the drum 25 to wind the cable 31 thereon, drawing the cable 30 into the field. When the cable reaches the plow or other implement, the push-button 84 is depressed to energize the motor 103 to disengage the clutch and stop operation of the drum 25. When the end of the cable 30 reaches the plow it is connected on one end thereof and the cable 31 on the other. After the cables are connected to the plow, the push-button 83 may be depressed to effect release of the latch 81 to permit engagement of the clutch and continue movement of the plow across the field toward the stake. When the plow reaches the side of the field, the push-button 84 is depressed to again energize the motor 103 to disengage the clutch. Then the push-button 82 is depressed to release the clutch 141 to permit the spring 98 to move the gear shift lever to the forward position and the push-button 83 is then operated to release the latch 118 to re-engage the clutch to drive the drum 24 to wind the cable thereon and draw the plow toward the vehicle, the full power of the motor being applied to the plow or other farm implement. As the drum 24 is operating, the sprocket thereon drives the chain to rotate the sprocket 51, which drives the gear 61 meshed with the gear 64 to drive the sprocket 66 and chain 64, rotating the sprocket 88 to turn the screw and move the cable guide thereon. When the cable guide reaches the end of its travel it engages the stop and resistance to movement causes pressure on the gear 61 tending to force same out of engagement with the gear 64. As the gear 61 moves out of engagement forcing the bar 69 in the opposite direction, it moves the pin 71 past the dead center position of the link 73 whereby the spring 76 continues the movement and completely disengages the gear 61 from the gear 64. This movement, which is an arc about the drive shaft 10, due to the arm 53 supporting the shaft 52 carrying the gear 61, also swings the arm 58 in an arc about the pin 62 to effect engagement of the gear 60 with the gear 64, whereby the gear 61 meshing with the gear 60 which in turn meshes with the gear 64, reverses direction of movement of the sprocket 66 and sprocket 68, turning the screw in a reverse direction to move the cable guide back across the frame in front of the drum 24. As the cable guide reaches the other end of its movement, it again engages a stop while the pressure tends to force the gear 60 out of engagement with the gear 64, swinging the arm 58 about the pin 62 and moving the gear 61 into engagement with the gear 64, which movement is continued by the pin 71 passing the dead center position of the link 73 whereby the spring 76 will complete the movement of the gear to effect engagement and reverse direction of the travel of the screw whereby the guide again moves across same. The guide for the drum 25 operates in the same manner.

It is believed obvious that I have provided a power moving apparatus and remote control therefor to impart a maximum of power on implements or the like and provide considerable flexibility in the operation, particularly adapting the apparatus for use in hilly and rough countries for all types of work herein.

What I claim and desire to secure by Letters Patent is:

1. In a vehicle having a plurality of cable reels thereon and a clutch adapted to connect and disconnect the motor with a gear shift transmission selectively connected to the reels for selectively driving same in forward and reverse directions, means for selectively engaging and disengaging the clutch, a lever for shifting the gears in the transmission from forward to reverse, a spring connected to the gear shift lever urging the lever to forward position, means including an electric motor connected to the gear shift lever, an electric circuit connected to the motor for energizing same and moving the gear shift lever to reverse position, a latch for retaining the gear shift lever in reverse position, a portable control box, a plurality of switches in the control box and connected in the electric circuits through a long multi-wire cable for controlling movement of the gear shift lever from a position remote to the vehicle, and means including an electric circuit operable from switches in the portable control box for releasing the latch whereby the spring will move the gear shift lever to forward position.

2. In a vehicle having a plurality of cable reels thereon and a clutch adapted to connect and disconnect the motor with a gear transmission selectively connected to the reels for selectively driving same in forward and reverse directions, a clutch lever for operating the vehicle clutch, a spring connected to the clutch lever for moving same to engage the clutch, means including an electric motor operatively connected to the clutch lever for moving same to disengaged position, an electric circuit for energizing said motor, a portable control box, a plurality of switches in the portable control box connected into the electric circuit by a long, multi-wire cable for controlling the electric circuits remotely of the vehicle, a lever for shifting the gears in the transmission from forward to reverse, a spring connected to the gear shift lever urging the lever to forward position, means including an electric motor connected to the gear shift lever, an electric circuit connected to the motor for energizing same and moving the gear shift lever to reverse position, a latch for retaining the gear shift lever in reverse position, a switch in said portable control box for controlling the electric circuits to energize the motor for moving the gear shift lever, and means including an electric circuit operable from positions remotely of the vehicle for releasing the latch whereby the spring will move the gear shift lever to forward position.

3. In a vehicle having a plurality of cable reels thereon and a clutch adapted to connect and disconnect the motor with a gear shift transmission selectively connected to the reels for selectively driving same in forward and reverse directions, a clutch lever for operating the clutch, a lever for shifting the gears in the transmission from forward to reverse, a reciprocable member connected to the clutch lever, a second reciprocable member connected to the transmission lever, electric motors having driving connection with the respective reciprocable members for operating same to move the respective levers, an electric circuit for energizing said motors, a portable control box, a plurality of switches in the control box, a long, multi-wire cable connecting the switches into the electric circuit for selective operation of the motors whereby said motors may be operated while the control box is remote to the vehicle, limit switches in the electric circuit and operable by the reciprocable members for stopping the respective motors when the clutch and transmission levers are moved to selected limits, latches for retaining the reciprocable members at a selected limit of movement in one direction, and means in the electric circuit operable from a switch in the portable control box for releasing said latches to permit movement of the reciprocable members in the reverse direction.

CHARLES L. KERN.

REFERENCES CITED

The following references are of record in the file of this patent:

UNITED STATES PATENTS

| Number | Name | Date |
| --- | --- | --- |
| 765,833 | Hamilton | July 26, 1904 |
| 1,411,829 | Atkinson | Apr. 4, 1922 |
| 1,413,094 | Bergey | Apr. 18, 1922 |
| 1,483,231 | Maynard | Feb. 12, 1924 |
| 1,801,246 | Foltz | Apr. 14, 1931 |

FOREIGN PATENTS

| Number | Country | Date |
| --- | --- | --- |
| 2,512 | Great Britain | of 1877 |